(12) United States Patent
Hatjasalo et al.

(10) Patent No.: US 7,153,789 B1
(45) Date of Patent: Dec. 26, 2006

(54) ELASTIC COMPOSITE STRUCTURE

(75) Inventors: Leo Hatjasalo, Helsinki (FI); Kari Rinko, Helsinki (FI)

(73) Assignee: Oy Oms Optomedical Systems Ltd, Helsinki (FI)

( * ) Notice: Subject to any disclaimer, the term of this patent is extended or adjusted under 35 U.S.C. 154(b) by 0 days.

(21) Appl. No.: 10/129,187

(22) PCT Filed: Nov. 1, 2000

(86) PCT No.: PCT/FI00/00952

§ 371 (c)(1),
(2), (4) Date: May 2, 2002

(87) PCT Pub. No.: WO01/32416

PCT Pub. Date: May 10, 2001

(30) Foreign Application Priority Data

Nov. 3, 1999 (FI) ................... 19992367

(51) Int. Cl.
*B32B 27/04* (2006.01)
*D03D 15/08* (2006.01)

(52) U.S. Cl. ............. 442/134; 442/184; 442/189; 428/428

(58) Field of Classification Search ............ 442/64, 442/60, 66, 68, 71, 134, 157, 184, 189; 428/428, 428/377, 411.1
See application file for complete search history.

(56) References Cited

U.S. PATENT DOCUMENTS

| | | | |
|---|---|---|---|
| 3,940,917 A | 3/1976 | Strachan | |
| 3,974,320 A | 8/1976 | Gerlach et al. | |
| 5,238,638 A | 8/1993 | Isayev | |
| 5,260,380 A | 11/1993 | Isayev | |
| 5,275,877 A | 1/1994 | Isayev | |
| 5,407,612 A * | 4/1995 | Gould et al. | 264/496 |
| 5,442,815 A * | 8/1995 | Cordova et al. | 2/161.7 |
| 5,447,594 A | 9/1995 | Josefsson | |
| 5,564,127 A | 10/1996 | Manne | |
| 5,597,649 A | 1/1997 | Sandor et al. | |

FOREIGN PATENT DOCUMENTS

| | | |
|---|---|---|
| DE | 19734803 | 3/1999 |
| EP | 0603745 | 6/1994 |
| EP | 0637614 | 2/1995 |
| WO | 90/15898 | 12/1990 |
| WO | 92/00343 | 1/1992 |
| WO | 97/07859 | 3/1997 |

* cited by examiner

*Primary Examiner*—Terrel Morris
*Assistant Examiner*—Lynda Salvatore
(74) *Attorney, Agent, or Firm*—Venable LLP; Eric J. Franklin

(57) ABSTRACT

An elastic composite structure including an elastomer system comprising at least one of a polyurethane resin, a polyurethane dispersion, or a silicone-based elastomer material. A mechanically durable reinforcer system includes a fabric, weave or knit structure including a flexible hybrid yarn including at least elastic polymer fibers, wherein the fabric, weave or knit structure is at least partially precoated/impregnated with an elastic and soft elastomer matrix to form a surface layer of the composite structure.

15 Claims, 5 Drawing Sheets

ELASTIC COMPOSITE STRUCTURE

FIELD OF THE INVENTION

The invention relates to an elastic composite structure, which is intended for use as a flexible, pliable and thin film structure in the manufacture of a 2-or 3-dimensional product, particularly for providing mechanical protection against cutting, puncturing and/or the like. The above type of elastic composite structures can be exploited e.g. in textile products for applications relating to health service and health care industry, as well as in a number of other contexts.

BACKGROUND OF THE INVENTION

In reference to the prior art, e.g. Patent publications EP 0,318,415, U.S. Pat. No. 5,230,937, U.S. Pat. No. 3,974,320, U.S. Pat. No. 5,447,594, U.S. Pat. No. 4,338,370, and JP 6278247 disclose structures, which are based on fabric or non-woven constructed plies of material. All of the above are inadequate in terms of their functions, especially due to their lack of strain or stretching property, and hence inapplicable for the manufacture of products which particularly require elasticity. The reason for this is that the fabric or non-woven structures used in such products are only capable of providing pliable or flexible constructions, which are not, however, actually stretchable. The foregoing applies also largely to the solutions disclosed in Patent publications JP 62297333, JP 11172860, and JP 1096227, all of which are not necessarily provided with a so-called fabric or non-woven structure as a reinforcement but, for example, with carbon fiber systems or the like. Even these solutions cannot enable the manufacture of a 2- or 3-dimensional elastic product, since the discussed solutions are only capable of producing pliable structures. All the foregoing solutions may be able to produce even highly flexible structures, yet incapable of producing structures which would be uni-, not to mention bi- or triaxially stretchable, as required by elasticity.

The prior art further discloses the implementation of structures provided especially with a fabric-based reinforcement structure, e.g. as set forth in Patent publications WO 9200343 or JP 60259682. Even at its best, the strain provided by these solutions is less than 36%, which restricts significantly the usefulness of such solutions in the manufacture of products requiring special elasticity. The inadequate strain properties and high module of elasticity result from and are based on the fact that the fabric structures used in connection therewith are consistent with traditional technology. Thus, a sufficient elasticity is not provided thereby, since in practical applications, particularly with regard to the demands of health care industry, the minimum requirement for elasticity is easily about 100%.

SUMMARY OF THE INVENTION

It is an object with an elastic composite structure of this invention to provide a decisive improvement over the foregoing problems and, thus, to raise substantially the current state of the art.

The most important benefits gained by an elastic composite structure of the invention include the simplicity of its construction and manufacture, which enables the manufacturing of products with very high elasticity, yet provided with sufficiently good mechanical strength properties, particularly against puncturing, cutting and/or the like. The inventive elastic composite structure is optionally feasible with a wide variety of constructions, the reinforcement system included therein being first of all constructible as a fabric, weave or knit structure made from a hybrid yarn, or else as an oriented flake reinforcement structure made from laminated flakes. In a preferred embodiment, the inventive fabric, weave or knit structure, shielded e.g. with a particularly elastic protective matrix, makes use of a hybrid yarn wound from rigid and elastic polymer fibers, thus effecting the maximization of an elasticity resource between friction points in a fabric, weave or knit structure. The inventive construction is also feasible by using one or more hard polymer layers, which is also integrally provided with an elastomer matrix for creating an elastic structure. It is further possible to exploit the invention as so-called combination structures by providing the same with both fabric-, weave- or knit-structured and laminate-structured reinforcement layers along with an elastomer matrix.

Thus, the inventive elastic composite structure offers a solution, which differs essentially and favourably from traditional solutions and which is applicable even in highly demanding conditions, e.g. in garments worn in the context of hospital hygiene as such, without separate and multilayer solutions dressed on top of each other.

BRIEF DESCRIPTION OF THE DRAWINGS

The invention will now be described in detail with reference made to the accompanying drawings, in which.

DETAILED DESCRIPTION OF THE DRAWINGS

The invention relates to an elastic composite structure, which is intended for use as a flexible, pliable and thin film structure in the manufacture of a 2-or 3-dimensional product, particularly for providing mechanical protection against cutting, puncturing and/or the like. The composite structure comprises firstly an elastomer system 1, which is constituted by one or more qualitatively different PUR- (polyurethane resin), PUD- (polyurethane dispersion), SI- (silicone) based elastomer materials and/or the like, and secondly by a mechanically durable reinforcer system 2, such as a fabric, weave or knit structure 2a made from one or more flexible hybrid yarns, an oriented flake reinforcement structure 2c made from laminated flakes y, and/or the like.

Figure 1A:
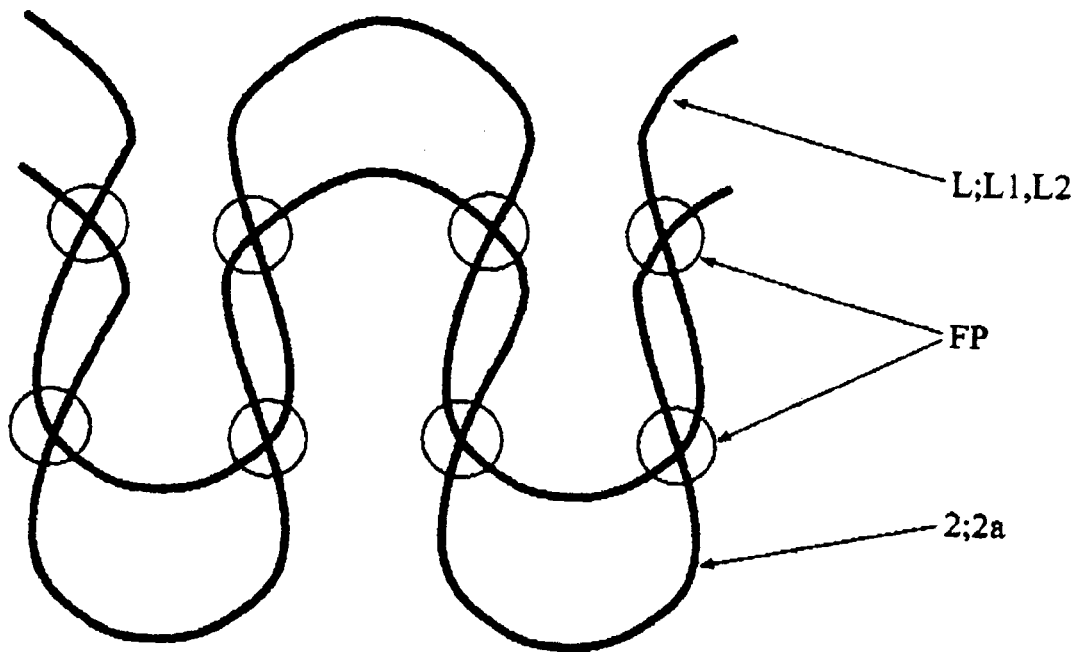
FIGS. 1a and 1b show a few preferred principles for an elastic composite structure of the invention, regarding particularly a knit-structured reinforcement system.
Figure 1B:
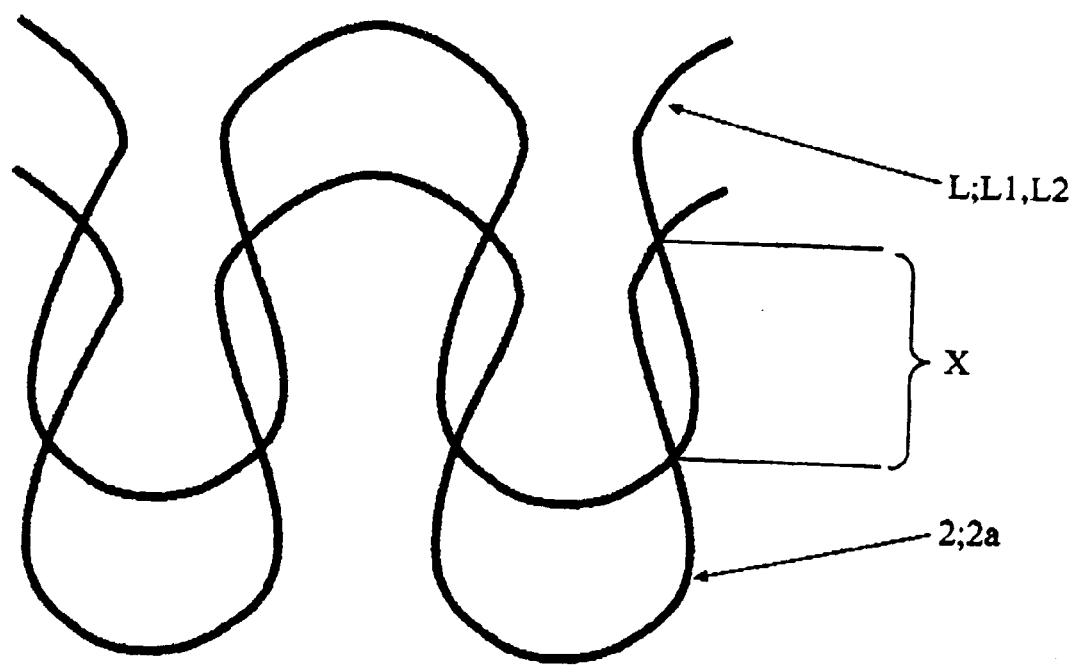

In a particularly preferred embodiment, a fabric structure, or the type of knit structure 2 depicted by way of example in FIGS. 1a and 1b, included in the reinforcement system of a composite structure, is manufactured from a hybrid yarn L wound from rigid and elastic polymer fibers L1, L2, such as liquid crystal polymer (LCP) and elastane fibers, particularly for the maximization of an elasticity resource x between friction points fp present in the fabric, weave or knit structure 2; 2a. This way, it is even possible to achieve a strain of e.g. 500% between the friction points. The hybrid yarn L is also relaxable e.g. by the application of heat, whereby the threaded multifilament structure thereof retains its carriage more effectively and provides the knit stitch with a proportional specific elasticity which is better than that obtained with a non-relaxed yarn. The manufacture of a hybrid yarn can be effected by using various fiber materials and systems, such as organic and inorganic fibers, mono- or multifilaments, for a variety of ultimate properties.

A knit structure constituted by the hybrid yarn L may be "overelastic" prior to coating, in spite of which, since the knitting loses some of its elasticity in the coating process, it is preferable that the hybrid yarn and the knitting be provided with as much of elasticity resource as possible in the above-described fashion. Naturally, a hybrid yarn can also be used for producing fabrics, weaves or the like.

Figure 2A:
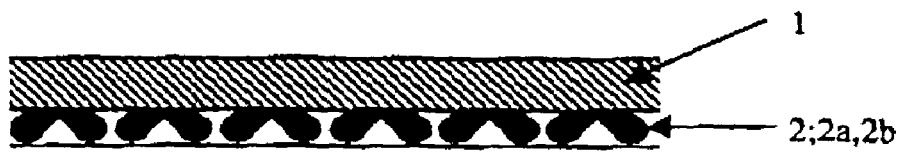
FIGS. 2a–2c show a few optional constructions for an elastic composite structure of the invention, regarding particularly a fabric-, weave- or knit-structured reinforcement system.
Figure 2B:
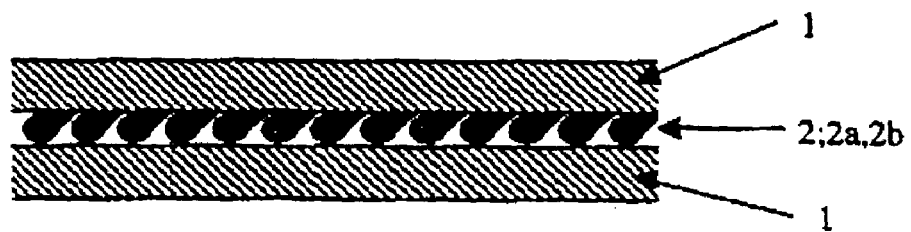
Figure 2C:
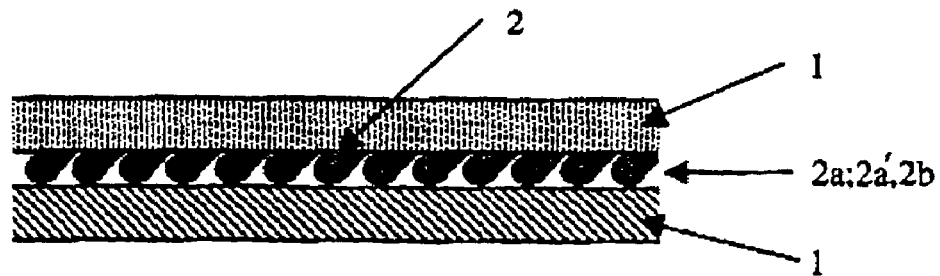

In a preferred application, especially in reference to the embodiments depicted in FIGS. 2a–2c, a fabric 2; 2a' or knit structure 2a included in the reinforcement system of a composite structure is precoated/-impregnated partially or entirely with an elastic and soft elastomer matrix 2b, which, at a strain of 100%, has a modulus of elasticity of 1.0 Mpa or less, particularly for protecting the hybrid yarn L and the friction points fp of the fabric, weave or knit structure 2; 2a, or for retaining the optimal elasticity feature of the fabric, weave or knit structure by forming the composite structure's actual surface layer 1 on top of the soft elastomer matrix 2; 2b.

In a further preferred embodiment, the elastomer matrix 2; 2b of the fabric 2a; 2a', weave or knit structure 2a is fabricated on a multicomponent principle by firstly pretreating the fabric, weave or knit structure locally or entirely with a first component, the fabric, weave or knit structure being secondly further coated with a blend of components, such as by dipping, spraying and/or in a like manner, by using a blend of components containing a second and third component, whereby, during the coating process, the second component has reacted with the first component so as to produce a soft and elastic matrix 2; 2b around/on top of the fabric, weave or knit structure 2; 2a, and the third component has produced a mechanically more durable surface layer 1 on top of the soft elastomer matrix.

In this context, the first component may comprise e.g. a prepolymer, the second component may be a crosslinker or a chain extender/former, and, furthermore, the third component can be a neutralized, inert poly-/elastomer.

Naturally, the above type of composite structure can also be prepared from a fabric, a weave or the like by coating as described above. The composite structure has a reinforcer content in the matrix preferably within the range of 5–95% by volume. With an optimized structure, it is possible to attain similar elasticity properties both in lengthwise and crosswise directions of the structure. This way, it is possible to vary the elasticity feature of a structure even over the range of 100%–1500%.

On the other hand, the invention relates to an elastic composite structure, which is intended for use as a flexible, pliable and thin film structure in the manufacture of a 2- or 3-dimensional product and which comprises a reinforcement system 2 for mechanically reinforcing the same against cutting, puncturing and/or the like. The reinforcement system 2 for a composite structure of the invention is prepared as a flake reinforcement system 2c, consisting of hard organic and/or inorganic materials and having its flakes y arranged as one or more hard polymer layers and, which contain an elastomer matrix 2; 2b adapted to provide the elastic structure with an integral composition. In this context, reference is made especially to FIGS. 3a–3c, all of which nevertheless include also the actual surface structure 1.

In a further preferred embodiment, the flake reinforcement for a composite structure of the invention is manufactured from a hard organic and/or inorganic material, having a surface area which is preferably >2 mm$^2$ and a thickness which is within the range of 0,02–1 mm, preferably by laminating from one or more hard polymer layers and by providing the laminated structure preferably also with extra reinforcements, such as an extremely thin and dense nonwoven or fabric reinforcer or the like.

Figure 5A:
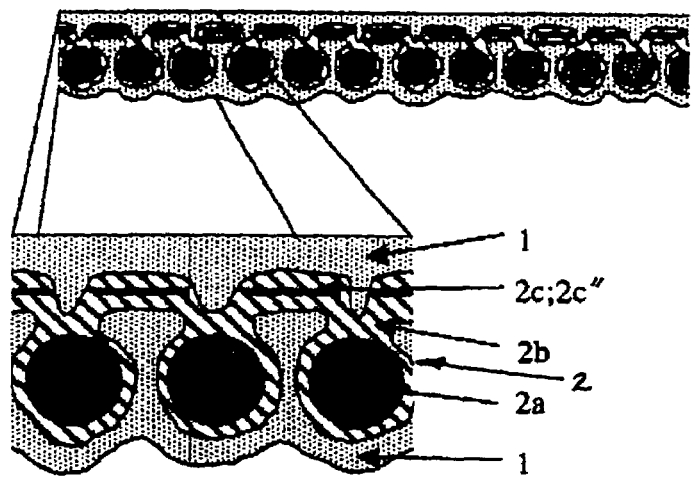
FIGS. 5a and 5b show further a few preferred constructions for an elastic composite structure of the invention, which have been produced by means of certain types of manufacturing techniques.

Preferred applications for this type of arrangement include e.g. the following solutions, wherein the flake reinforcement system 2; 2c is designed as an integral and comprehensive mechanical protective layer, in which one or more structural layers of the flake reinforcement system are established:

by applying the flakes y with mechanical and/or manual orientation to the surface of an elastomer coating 1;

by applying the flakes y to the surface of an elastomer coating 1 electrostatically by spraying along with the soft elastomer coating 2; 2b;

by applying the flakes y with free orientation to the surface of an elastomer 1; or by applying the flakes y electrostatically "or pneumatically so as to locate the same as desired to constitute a desired type of orientation layer 2c; 2c" prior to a subsequent elastomer coating 1, this application being depicted especially in FIG. 5a.

Figure 3A:
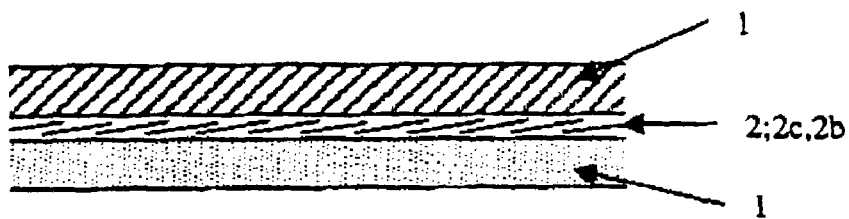
FIGS. 3a–3c show further a few preferred optional solutions for an elastic composite structure of the invention, regarding particularly a reinforcing flake-structured reinforcement system.
Figure 3B:
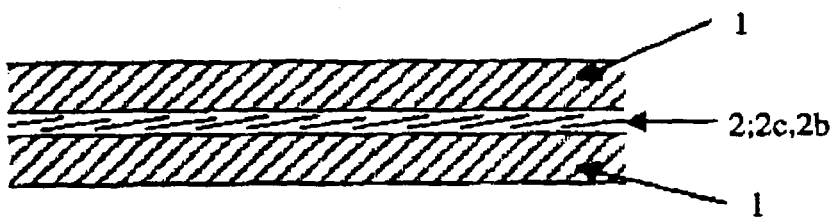
Figure 3C:
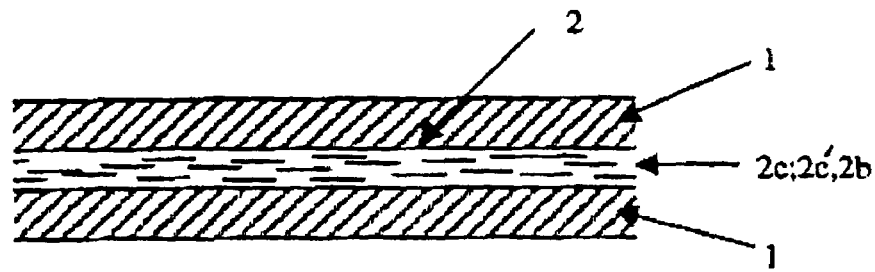

Referring especially to what is described above, orientation of the flakes y is most preferably carried out electrostatically in such a way that the flakes y have been polarified for a desired orientation by using, as an orientation pattern, a so-called imbricate structure or the like as shown e.g. in FIG. 3a or 3b, or else a free orientation 2c; 2c' as shown e.g. in FIG. 3c.

In the preferred embodiments shown especially in FIGS. 4a–4d, the reinforcement system 2 included in a composite structure has been prepared from a combination of reinforcements, comprising the fabric, weave and knit structure 2a and the flake reinforcement layers 2c.

As a further preferred application, the flake reinforcement composition 2c is attached in this type of embodiment to the fabric, weave or knit structure 2a by means of an anchoring technique, the flake reinforcement being treated with a first component and the fabric, weave or knit structure, respectively, either comprehensively or locally, with a second component for providing a desired adhesion between the fabric, weave or knit structure and the flake reinforcement at a desired location.

Figure 5B:
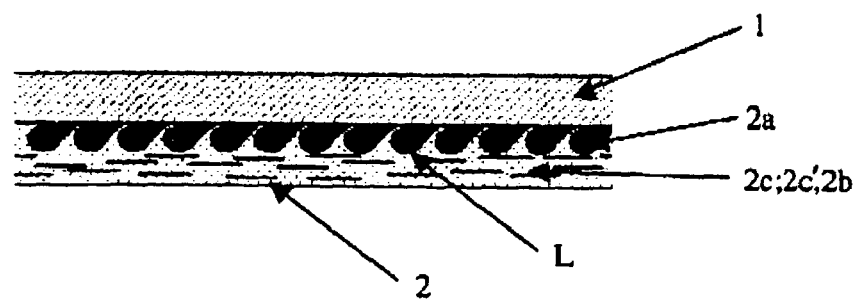

In particular reference to the construction shown in FIG. 5b, a flake reinforcement system 2c; 2c' is provided on top of a fabric, weaved or knitted structural layer 2a, coupled with an elastomer coating 1, so as not to restrain the elasticity of the fabric, weaved or knitted structural layer, by the application of a multicomponent principle or the like, the flake reinforcement being treated with a third component, which does not provide an adhesion with the fabric, weave or knit structure 2a, or with a yarn L used therein.

Figure 4A:
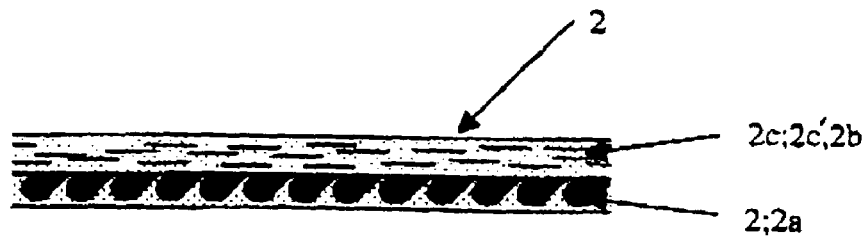
FIGS. 4a–4d show further preferred embodiments for an elastic composite structure of the invention in the way of so-called combination structures.
Figure 4B:
Figure 4C:
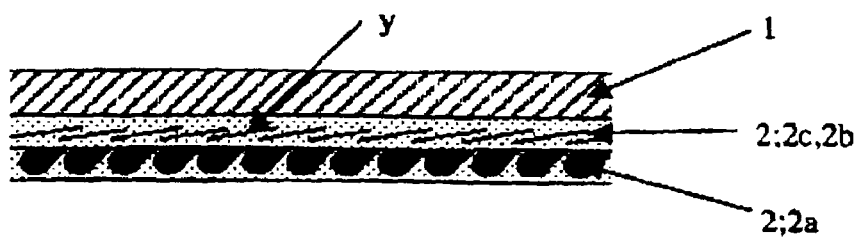
Figure 4D:
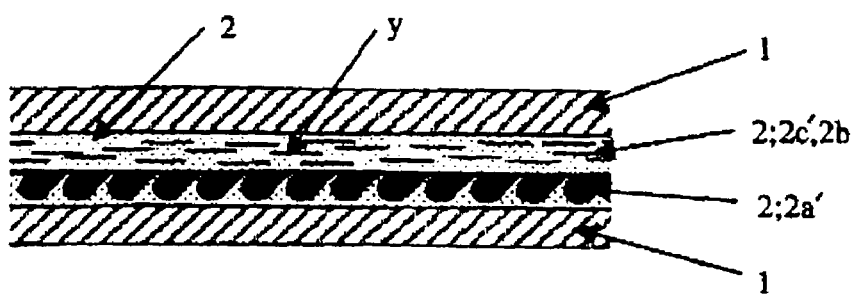

It is obvious that the invention is not limited to the applications described or depicted above but, as disclosed in the following examples, it can be applied in most diverse variations. Thus, particularly cutting proof structures as shown especially in FIGS. 2a–2c, as well as puncture-proof structures as shown especially in FIGS. 3a–3c, or else both cutting- and puncture-proof structures as shown in FIGS. 4a–4c may of course be prepared by the application of most diverse manufacturing techniques, e.g. in such a way that such structures are pre-designed with a certain type of surface texture, such as groove patterns, nodule patterns or the like. In addition, the use of suitable manufacturing techniques, such as electrostatic coating, also enables the preparation of perfectly three-dimensional products, such as gloves or the like, which additionally provide a so-called perfect fit in such a way that, instead of tubular forms, the manufacturing process is set to produce structures having cross-sections which vary in the longitudinal direction thereof. Furthermore, the type of elasticity principles depicted particularly in FIGS. 2a and 2b will be fulfilled also in the case of fabric-, weave- or web-structured texture structure by using a twisted hybrid yarn.

The invention claimed is:

1. An elastic composite structure, comprising:
   a mechanically durable reinforcing layer comprising an elastic fabric, weave or knit structure including a flexible hybrid yarn comprising rigid and elastic polymer fibers, the reinforcing layer further comprising an oriented flake reinforcement structure comprising laminated flakes, and wherein the flake reinforcement is treated with a first component and the fabric, weave or knit structure, is treated comprehensively or locally with a second component for providing a desired adhesion between the fabric, weave or knit structure and the flake reinforcement at a desired location;
   an elastic protecting matrix for the reinforcing layer, the elastic protecting matrix comprising an elastic and soft elastomer matrix at least partially coating/impregnating the fabric, weave or knit structure of the reinforcing layer, the elastic protecting matrix being operative to retain elasticity of the reinforcing layer; and
   a surface layer comprising an elastomer system covering the elastic protecting matrix and the reinforcing layer, the surface layer comprising at least one of a polyurethane resin, a polyurethane dispersion, or a silicone-based elastomer material.

2. The composite structure according to claim 1, wherein the structure is a flexible, pliable thin structure.

3. The composite structure according to claim 1, wherein the structure is operative in the manufacture of a 2-or 3-dimensional product.

4. The structure according to claim 1, wherein the structure provides mechanical protection against cutting and puncturing.

5. The composite structure according to claim 1, wherein the elastic polymer fibers comprise elastane fibers.

6. The composite structure according to claim 1, wherein the rigid polymer fibers comprise liquid crystal polymer.

7. The composite structure according to claim 5, wherein the elastic polymer fibers maximize an elasticity resource between friction points present in the fabric, weave or knit structure.

8. The composite structure according to claim 1, wherein the soft elastomer matrix protects the hybrid yarn and the friction points of the fabric, weave or knit structure.

9. The composite structure according to claim 1, wherein the soft elastomer matrix retains a maximum elasticity feature of the fabric, weave or knit structure.

10. The composite structure according to claim 1, wherein the flakes comprise at least one of hard organic or inorganic materials, wherein the flakes are arranged as one or more hard polymer layers including an elastomer matrix adapted to provide the elastic structure with an integral composition.

11. The composite structure according to claim 1, wherein the flakes are polarified for a desired orientation by using, as an orientation pattern, an imbricate structure, or a free orientation.

12. The composite structure according to claim 1, wherein the flake reinforcement system is provided on top of the fabric, weave or knitted structural layer.

13. The composite structure according to claim 12, wherein the flake reinforcement system does not block the elasticity of the fabric, weave or knitted structural layer.

14. The composite structure according to claim 12, wherein the flake reinforcement system is provided by application of a multicomponent principle, wherein the flake reinforcement is treated with a third component that does not adhere to the fabric, weave or knit structure, or with a yarn used therein.

15. The composite structure according to claim 1, wherein the flake reinforcement system comprises an integral and comprehensive mechanical protective layer, wherein the flakes are applied with mechanical and/or manual orientation to the surface of an elastomer coating, applied to the surface of an elastomer coating electrostatically along with the soft elastomer coating, applied with free orientation to the surface of an elastomer, or applied electrostatically or pneumatically so as to locate the flakes as desired such that the flakes constitute a desired type of orientation layer prior to a subsequent elastomer coating.

* * * * *